(12) United States Patent
Steffen

(10) Patent No.: US 6,735,066 B2
(45) Date of Patent: May 11, 2004

(54) PROTECTIVE DEVICE FOR AN ELECTRIC CONSUMER

(75) Inventor: Michael Steffen, Stockdorf (DE)

(73) Assignee: Wacker Construction Equipment AG, Munich (DE)

( * ) Notice: Subject to any disclaimer, the term of this patent is extended or adjusted under 35 U.S.C. 154(b) by 0 days.

(21) Appl. No.: 10/182,098

(22) PCT Filed: Jan. 9, 2001

(86) PCT No.: PCT/EP01/00171

§ 371 (c)(1),
(2), (4) Date: Jul. 22, 2002

(87) PCT Pub. No.: WO01/56129

PCT Pub. Date: Aug. 2, 2001

(65) Prior Publication Data

US 2003/0011950 A1 Jan. 16, 2003

(30) Foreign Application Priority Data

Jan. 25, 2000 (DE) .......................... 100 03 064

(51) Int. Cl.⁷ .................................................. H02G 9/06
(52) U.S. Cl. ....................... 361/119; 361/117; 361/118; 361/120; 361/124
(58) Field of Search ................. 361/119, 117, 361/118, 120, 124, 127, 56, 58, 111, 112, 115, 91.1, 93.3, 103–104, 42, 45, 93.1, 62, 64, 66

(56) References Cited

U.S. PATENT DOCUMENTS 4,520,417 A * 5/1985 Frank
5,477,017 A * 12/1995 Swindler et al.
5,864,455 A  1/1999 Gernhardt et al.

FOREIGN PATENT DOCUMENTS

GB  2 181 599  4/1987

* cited by examiner

Primary Examiner—Dean A. Reichard
Assistant Examiner—Nguyen T. Ha
(74) Attorney, Agent, or Firm—Boyle Fredrickson Newholm Stein & Gratz S.C.

(57) ABSTRACT

The invention relates to a protective device for an electric consumer. A residual-current circuit-breaker is located in an electrical supply line between a mains connection and a switch device of the consumer. Said residual-current circuit-breaker has a detection device for recognizing a residual current and a first interrupter for interrupting the supply of electricity from the mains connection to the switch device in accordance with a switching signal from a detection device. If an electrical energy storage device is provided in the switching device, a second interrupter is provided, this second interrupter being controlled by the residual-current circuit-breaker.

10 Claims, 1 Drawing Sheet

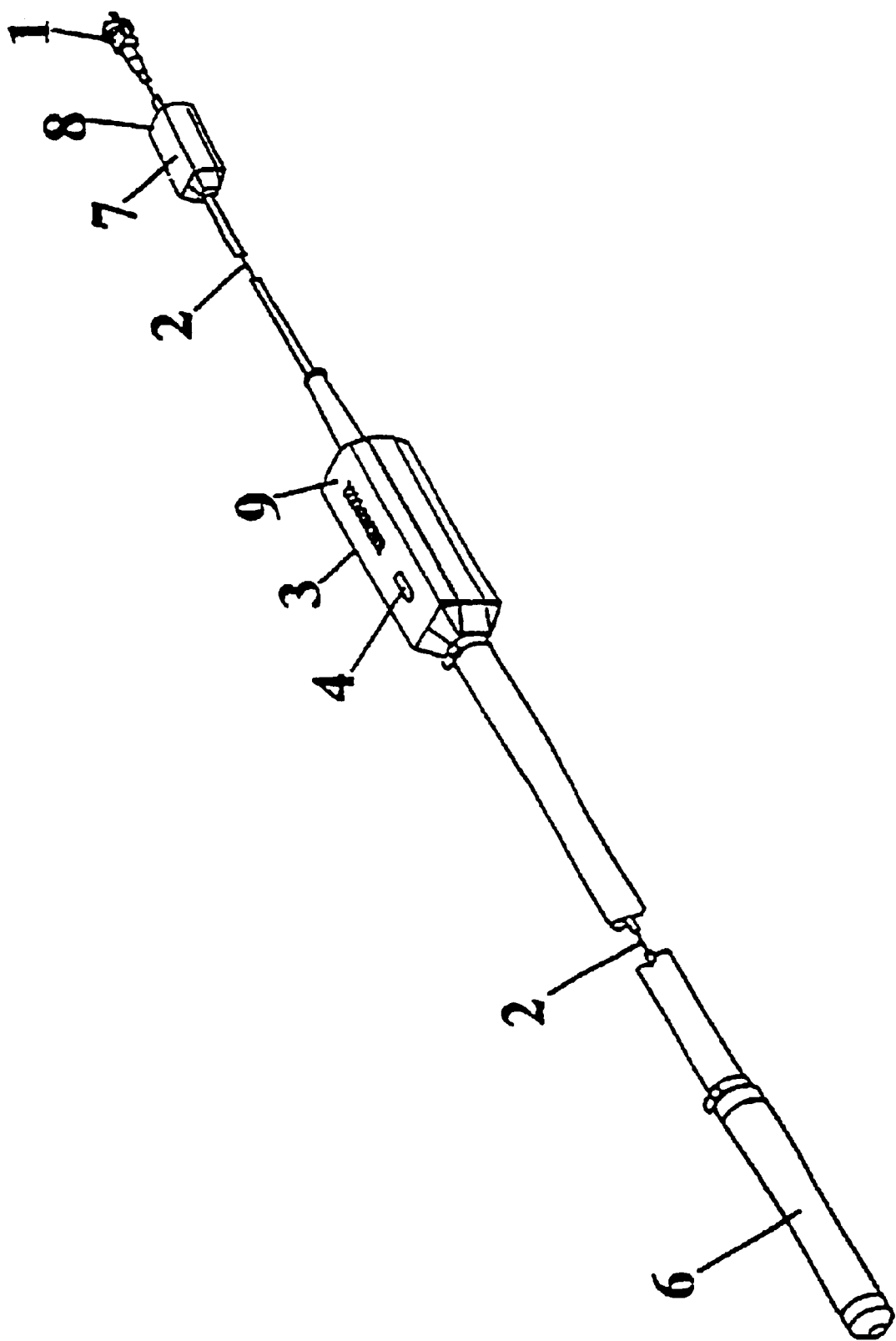

PROTECTIVE DEVICE FOR AN ELECTRIC CONSUMER

The invention relates to a protective device for an electric load according to the preamble of claim 1.

Electric tools such as, e.g. hand drills are frequently constructed with double protective insulation, i.e. that, apart from a primary insulation in the motor itself, a further second insulation, e.g. in the form of an insulating housing, is provided. However, electric machines are also known in which double protective insulation is not possible because, e.g. the external housing must consist of metal. To ensure the required safety for the operator in these cases, so-called fault current circuit breakers like, e.g. generally known ground-fault circuit interrupters are frequently provided which are capable of detecting a fault current and, if necessary, of immediately interrupting the current supply to the electric device. In some countries, there is, therefore, a rule to provide such circuit breakers in switchgear cabinets and distribution cabinets. In most countries, however, there is no such rule.

The resultant problems can be partially resolved by a protective device (safety interrupter PRCD-S by KOPP) by means of which a fault current circuit breaker can be built into the feed line to the load.

Furthermore, electric devices are known in which the electric energy supplied from the outside via a mains connection can be temporarily stored in an energy store, e.g. a capacitor which can be, e.g. a component of a frequency converter, and is forwarded only with a time delay. In such devices, the protective effect of the fault current circuit breaker can fail since the energy stores are often equipped with such a high capacity that they still store sufficient energy to put the operator seriously at risk in spite of the current supply from the outside being interrupted. This means that a fully effective protection of the operator can not always be guaranteed even when the fault current circuit breaker is provided in the distribution cabinet.

The invention is based on the object of specifying a protective device for an electric load which effectively prevents fault currents from arising even when there is no corresponding protective device in the power system or, respectively, the device exhibiting the electric load is provided with an energy store in which the current supply by the mains is temporarily stored.

According to the invention, the object is achieved by a protective device having the features of claim 1. Advantageous further developments of the invention can be found in the dependent claims.

In the protective device according to the invention, a fault current circuit breaker is arranged between the mains connection and a switching device in a feed line connecting a mains connection to an electric load. The fault current circuit breaker exhibits a detection device for detecting a fault current and a first interrupter for interrupting a current supply from the mains connection to the switching device in dependence on a switching signal from the detection device. Furthermore, a second interrupter which can be switched by the switching signal from the detection device is provided downstream of the first interrupter closer to the load. The first interrupter is advantageously arranged in such a manner that it can interrupt the current supply from the mains connection to the fault current circuit breaker. Since the second interrupter is arranged closer to the load, it protects the latter, and the operator, better than is possible by means of the first interrupter alone. This applies, in particular, if the second interrupter isolates the current supply electronically.

By arranging the fault current circuit breaker in the area of the current feed line to the electric device or, respectively, directly at the mains plug in this manner, it can immediately deenergize the electric load, and thus the entire electric device, when a fault current is detected. As a result, almost the entire device can be protected against fault currents even if there is no fault current circuit breaker in the distribution cabinets belonging to the power system.

Providing the second interrupter is particularly suitable for electric devices in which an energy store is provided for temporarily storing electric energy in the area of the switching device, e.g. as a component of a frequency converter. As already explained above, there is a risk with such energy stores that they can still store enough energy to put the operator at risk due to fault currents in spite of an interrupted mains current supply. This problem can still exist even if the first interrupter has already been activated.

The energy store is arranged, e.g. between the fault current circuit breaker and the switching device. Any current flow to or from the energy store can be interrupted by the second interrupter. The detection device is thus capable of activating by means of the switching signal not only the first interrupter which disconnects the electric device from the mains but also the second interrupter which should be arranged as closely as possible to the energy store. If a fault current occurs in this case, e.g. at the electric load, the connection to the mains, the connection to the energy store and the connection of the energy store to the output of the power section (e.g. the output stage of a frequency converter) is interrupted. The energy stored in the energy store can no longer escape which eliminates any risk to the operator.

In a further advantageous embodiment of the invention, the first and/or the second interrupter are closed only when the switching signal is present. If there is no switching signal, the electric connection is broken. This ensures that the fault current circuit breaker is operating correctly and has not been removed from the device, either. It is impossible to put the device into operation when the fault current circuit breaker is missing.

In the text which follows, these and other advantages and features of the invention will be explained in greater detail by means of an example and with the aid of the accompanying FIGURE.

BRIEF DESCRIPTION OF THE DRAWING

The sole FIGURE shows an immersion vibrator for compacting concrete which is still liquid as an example of an electric device.

DETAILED DESCRIPTION OF THE PREFERRED EMBODIMENT

The electric current is introduced into the device at a mains plug 1, used as mains connection, and conducted to a switching device 3 via a feed line 2. The switching device 3 exhibits at least one on/off switch 4. In the example shown, a frequency converter (not shown) known per se, with an electrolytic capacitor used as energy store, is also provided in the switching device 3.

The feed line 2 then leaves the switching device 3 and is conducted to a vibrator 6, sheathed in a protective and operating tube 5. In the vibrator 6, an elongated electric motor used as electric load is accommodated which rotationally drives a flyweight also arranged in the vibrator 6 as a result of which the vibrations of the vibrator required for compacting the concrete can be generated. The operator then handles the vibrator 6 at the protective and operating tube 5.

The immersion vibrator hitherto described is generally known and has been very successful in hard use on construction sites.

The novel feature on the immersion vibrator as shown in the FIGURE is a fault current circuit breaker 7 accommodated in a housing which can be implemented, e.g. by a ground fault circuit interrupter known per se.

In such a ground fault circuit interrupter, the current feed line and the current return line are jointly surrounded by an iron core which monitors the magnetic field strength of the conductors. If the current feed line carries a stronger current than the current return line due to a fault current, a differential magnetic field arises in spite of the superposition of the magnetic fields of the two conductors, which is detected by the iron core and then converted in a further circuit, known per se, into a switching signal which is supplied, e.g., to a relay used as interrupter for interrupting the current supply.

Accordingly, the fault current circuit breaker 7 consists of a detection device which detects the presence of a fault current and thereupon generates a switching signal or, respectively, interrupts an existing signal, and of a first interrupter 8 which interrupts the current supply from the mains plug 1 to the fault current circuit breaker 7 and thus deenergizes the entire immersion vibration. In this manner, any risk to the operating personnel due to fault currents can be reduced particularly in installations in which no ground fault circuit interrupters are provided in switchgear cabinets or distribution cabinets.

As already described, the immersion vibrator exhibits in the switching device 3 a frequency converter which comprises an energy store in the form of a capacitor. Even when a fault current occurs, e.g. by removal of the insulation of the feed line 2 in the vicinity of the vibrator 6 and the fault current circuit breaker 7, in consequence, removes the device from the mains, the energy stored in the energy store is sufficient for still generating a fault current which can put the operator at risk.

To prevent such a threat, a second interrupter 9 is provided by means of which the energy store can be isolated from the remaining electric components, particularly the feed line 2. The second interrupter 9 is also activated via the switching signal from the detection device of the fault current circuit breaker 7 and as a result ensures that on occurrence of a fault current and the subsequent interruption, the energy of the energy store cannot be delivered and can thus not put the operator at risk. The second interrupter 9 should be of such a construction that it can completely isolate the energy store from its environment so that the current is also prevented from flowing back, e.g. in the direction of the fault current circuit breaker 7. To achieve the fastest possible response of the second interrupter 9 it should be implemented by electronic components in the manner familiar to the expert.

To supply the switching signal from the spatially distant fault current circuit breaker 7 to the second interrupter 9, a data transmission link is provided. This can consist, e.g. of one or more cables run in parallel with the feed line 2. However, it is also possible to generate a signal modulated onto the electric current in the feed line 2 or to generate a brief interruption of the current supply within a range of a few milliseconds which is interpreted as a control pulse by the second interrupter 9. Finally, a transmission of the control signal by means of optical waveguides, radio signals or any other type of familiar signal transmission is also conceivable.

In a particularly safe variant, the first and the second interrupter 8, 9 only permit a current flow if the switching signal is at a high level. If the switching signal drops off or is missing entirely, e.g. if the fault current circuit breaker 7 has been removed from the device without authorization, the interrupters 8, 9 prevent a current from being supplied. Such a "fail-safe" operation allows the immersion vibrator to be taken into operation only when the fault current circuit breaker is functioning properly.

What is claimed is:

1. A protective device for an electric load comprising:

a mains connection;

a feed line from the mains connection to the load; and a switching device provided in the feed line and operable to switch the load on and off;

a fault current circuit breaker arranged in the feed line between the mains connection and the switching device, wherein the fault current circuit breaker includes a fault detection device operable to provide a switching signal upon detection of a fault current, and a first interrupter that is in communication with the fault detection device and that is configured to interrupt the electrical current supply from the mains connection to the switching device upon receiving the switching signal from the fault detection device; and further comprising a second interrupter in communication with the fault detection device and located between the first interrupter and the load, the second interrupter being configured to interrupt the electrical current supply from the mains connection to the load upon receiving the switching signal from the fault detection device.

2. The protective device as claimed in claim 1, wherein the first interrupter is operable to interrupt an electrical current supply from the mains connection to the switching device.

3. The protective device as claimed in claim 1, wherein the fault current circuit breaker is arranged in the area of the mains connection.

4. The protective device as claimed in claim 1, further comprising an energy store operable to temporarily store a electric energy supplied via the mains connection, the energy store being arranged between the fault current circuit breaker and the switching device.

5. The protective device as claimed in claim 4, wherein the second interrupter is arranged at the energy store.

6. The protective device as claimed in claim 4, wherein the energy store is a component of a frequency converter.

7. The protective device as claimed in claim 1, wherein the second interrupter is arranged at the load.

8. The protective device as claimed in claim 1, wherein the switching signal is transmitted via a data transmission link from the fault detection device to the second interrupter.

9. The protective device as claimed in claim 1, wherein the electric connection is broken by the first and/or the second interrupter when the fault detection device is removed.

10. The protective device as claimed in claim 1, wherein the second interrupter is an electronic interrupter.

* * * * *